United States Patent [19]
Kliesow et al.

[11] Patent Number: 5,992,616
[45] Date of Patent: Nov. 30, 1999

[54] APPARATUS FOR THE GUIDING OF WORKPIECES

[75] Inventors: Wolfgang Kliesow; Edgar Stengel, both of Remscheid, Germany

[73] Assignee: AEG Elotherm GmbH, Remscheid, Germany

[21] Appl. No.: 09/067,849

[22] Filed: Apr. 27, 1998

[51] Int. Cl.$^6$ .................................................. B65G 21/20
[52] U.S. Cl. .................................................. 198/836.3
[58] Field of Search .............................. 198/836.1, 836.3, 198/836.4, 535, 539; 193/2 R, 2 D, 15

[56] References Cited

U.S. PATENT DOCUMENTS

| 376,531 | 1/1888 | Lentz | 193/15 |
| 5,386,900 | 2/1995 | Horth et al. | 199/836.3 X |
| 5,778,634 | 7/1998 | Weaver et al. | 198/836.1 X |

FOREIGN PATENT DOCUMENTS

| 998476 | 1/1952 | France . |
| 1583323 | 7/1970 | Germany . |
| 2241736 | 3/1974 | Germany . |
| 209211 | 8/1989 | Japan . |

Primary Examiner—James R. Bidwell
Attorney, Agent, or Firm—Proskauer Rose LLP

[57] ABSTRACT

The invention relates to an apparatus for the guiding of workkpieces (2) which has at least one curved guideway (11, 12) and which renders automatic emptying simple. This is achieved according to the invention by a guide device (16, 17) which can be adjusted in the guide path provided by the curved guideway (11, 12) and which in the state adjusted into the guide path transfers the workpieces (2) in a straight line from the inlet (50) of the curved guideway (11, 12) to its outlet (51).

5 Claims, 3 Drawing Sheets

5,992,616

APPARATUS FOR THE GUIDING OF WORKPIECES

BACKGROUND OF THE INVENTION

The invention relates to a device for the guiding of workpieces which has at least one curved guideway. Apparatuses of the kind specified are used, for example, in installations in which forgings are heated and graphitised. In such installations the curved guideway is guided through a graphitising basin, so that the workpieces pass on their conveying path through the graphitising basin and are wetted with graphitising agent. Then they are guided through the adjoining rectilinear guideway in a rectilinear conveying movement through the heating devices following the graphitising basin.

In installations of the aforementioned kind the workpieces are as a rule driven by roller drives which are disposed in the inlet zone of the apparatus and seize the workpieces laterally. Each workpiece freshly supplied to the guideway is advanced by the roller drives and pushes forward the preceding workpieces disposed in the guideway. Alternatively, installations are known in which a number of drives is provided which are disposed at predetermined intervals laterally of the guideway, so that over their conveying path the workpieces receive a driving thrust several times.

A basic problem of using apparatuses of the kind specified equipped with curved guides in installations which convey the workpieces continuously is that it is difficult to empty the guideways automatically. They must be so emptied, for example, if the processing of a particular charge of workpieces has been completed or if malfunctions occur in the installation equipped with the guide apparatus. With curved guidways it is impossible to use ejectors such as are used on purely linear guideways for the ejection of workpieces still situated in the guide path. For this reason, with the apparatuses known in practice the curved guideway must be emptied manually, with consequent loss of time.

SUMMARY OF THE INVENTION

It is an object of the invention to use simple, cheap means to provide an apparatus of the kind specified by means of which the guideway can be automatically emptied in a problem-free manner.

The problem is solved by an apparatus of the kind specified having a guide device which can be moved into the guide path provided by the curved guideway while entraining workpieces disposed in the guideway and which in the state positioned into the guide path so bridges the curved guideway that the workpieces are transferred in a straight line from the inlet of the curved guideway to its outlet.

The apparatus according to the invention enables the curved guideway to be so bridged a guide device that the workpieces are moved in a straight line over the curves provided by the curved guideway. The guide device is so arranged that as soon as it is adjusted into the guide path it also transfers even the workpieces previously still present in the curve of the curved guideway into the rectangular guideway. This enables an ejector to be used for emptying the device in a conventional cheap manner. The cost for the guide device and its adjustment is so low that even existing guide apparatuses can inexpensively be re-equipped in the manner according to the invention.

The apparatus according to the invention is more particularly suitable for use in an installation in which workpieces are to be heated and graphitised prior to forging. More particularly in such installation the curved guideway of the apparatus according to the invention is preferably connected to a rectilinear guideway which is disposed in alignment with a second rectangular guideway which follows the curved guideway downstream in the conveyed direction.

A preferred embodiment of the invention is characterised in that workpieces are guided on two opposite sides of each curved guideway; one of the curved guideways is adjustable; and the adjusting movement of the guide device is coupled to the adjusting movement of the adjustable curved guideway. Such double guiding ensures that the workpieces are precisely guided even in the zone of the curve. At the same time, the coupling of the second curved guideway to the adjustable guide device ensures that the second curved guideway is moved together with the guide device during its adjustment. This ensures that when the upper curved guideway does not impede the rectangular conveying of the workpieces when the guide device is in its bridging position for emptying.

A variant of the invention which can be particularly simply produced is characterised in that the width of the curved guideway is smaller than the width of the workpieces, and each adjustable guide device is disposed laterally of the curved guideway. The relatively small width of the curved guideway enables the guide devices to be so disposed laterally thereof in a problem-free manner that they guide the workpieces reliably in case of their adjustment.

Preferably the guide device should take the form of a guide rod. Such a guide rod not only occupies a small amount of space but it also enables the workpieces to be reliably guided with low friction in linear contact.

BRIEF DESCRIPTION OF THE DRAWINGS

An embodiment of the invention will now be explained in greater detail with reference to the diagrammatic drawings, which show.

DETAILED DESCRIPTION OF THE INVENTION

Figure 1:
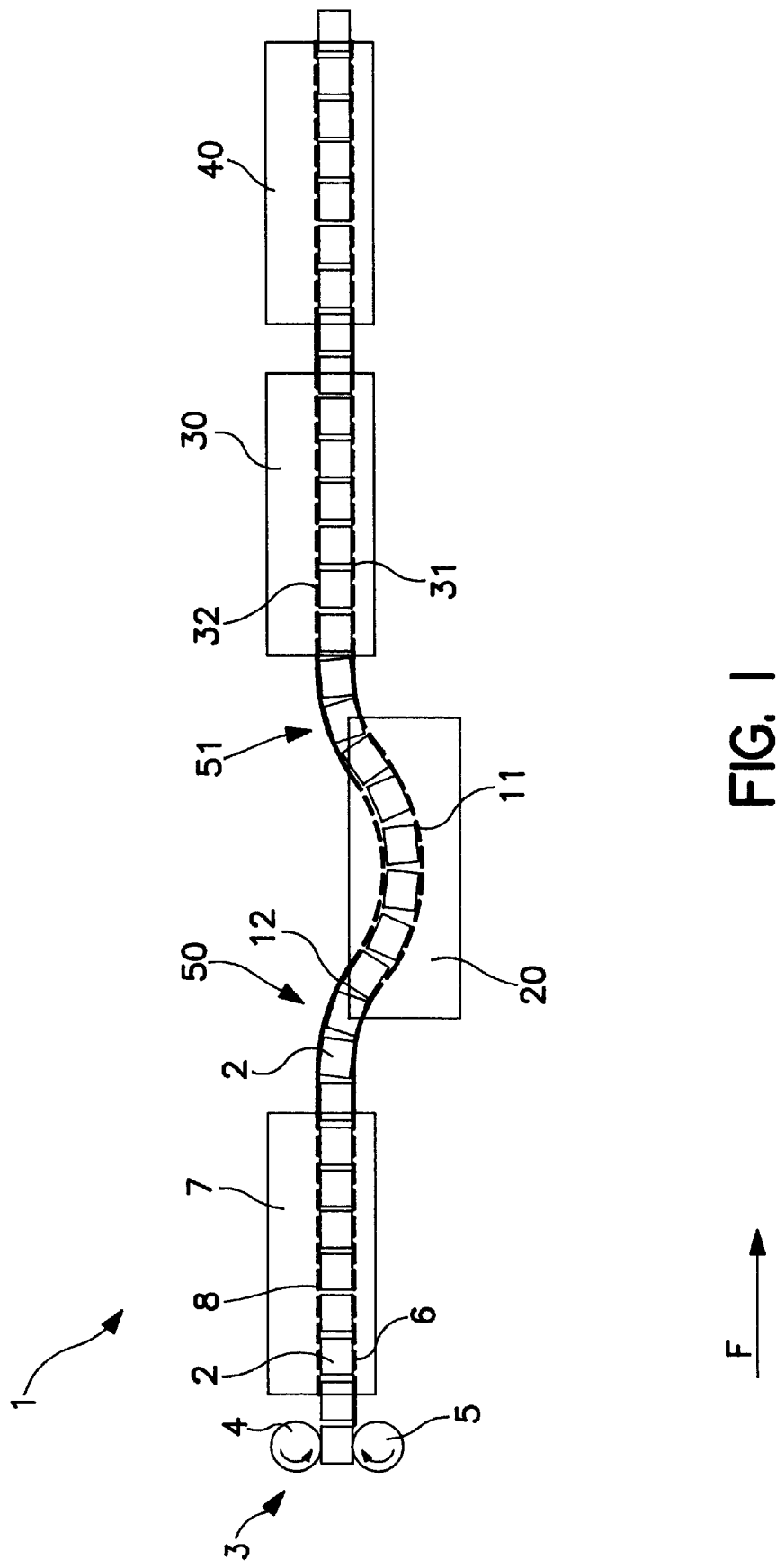
FIG. 1 a side elevation of an installation for the heating and graphitising of forgings, FIG. 2 a side elevation of an apparatus used in the installation shown in FIG. 1 for guiding the forgings, FIG. 3 the apparatus shown in FIG. 2, sectioned along the line A—A in FIG. 2, FIG. 4 the apparatus shown in FIG. 2 in a second operational position, and FIG. 5 the apparatus shown in FIG. 4, sectioned along the line B—B in FIG. 4.
Figure 2:
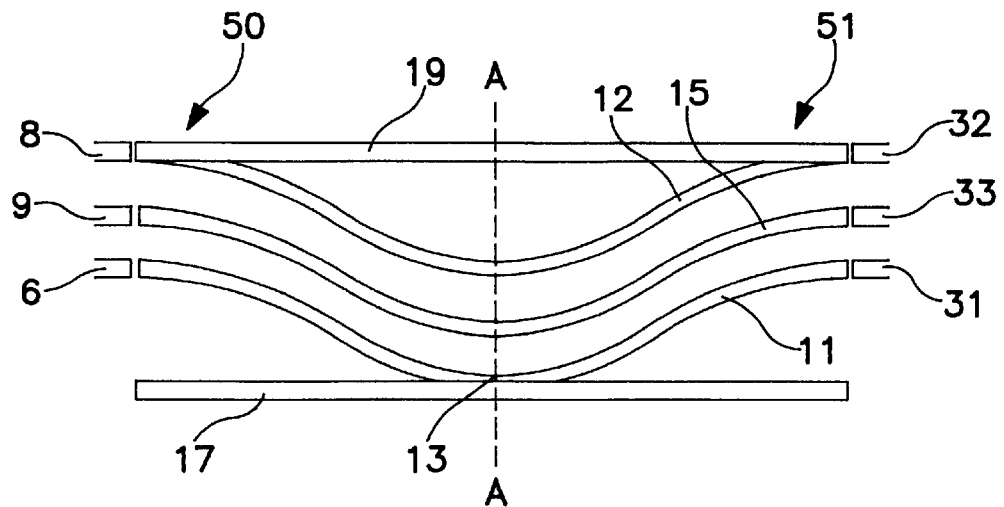
Figure 3:
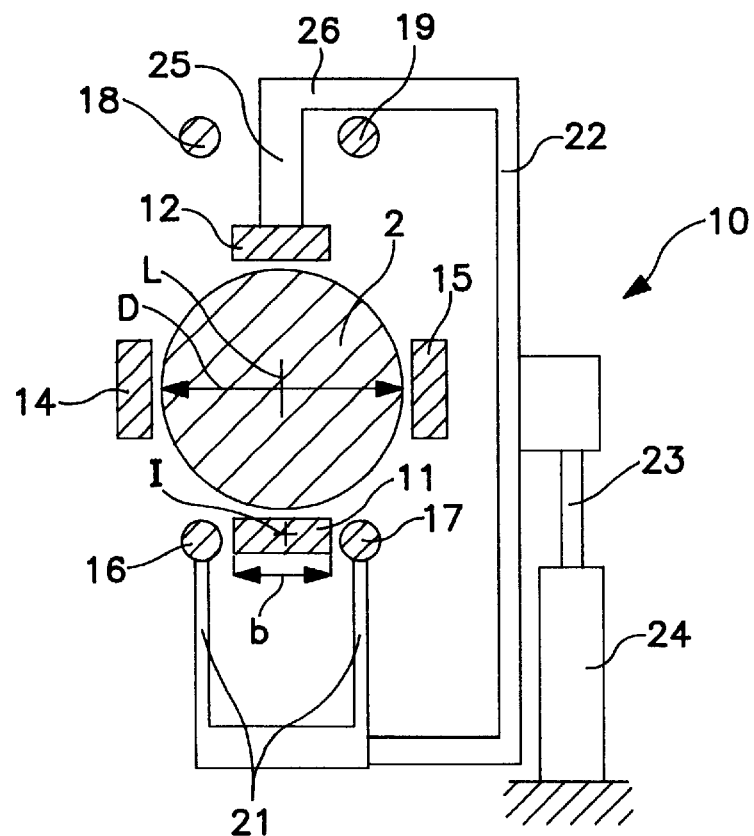
Figure 4:
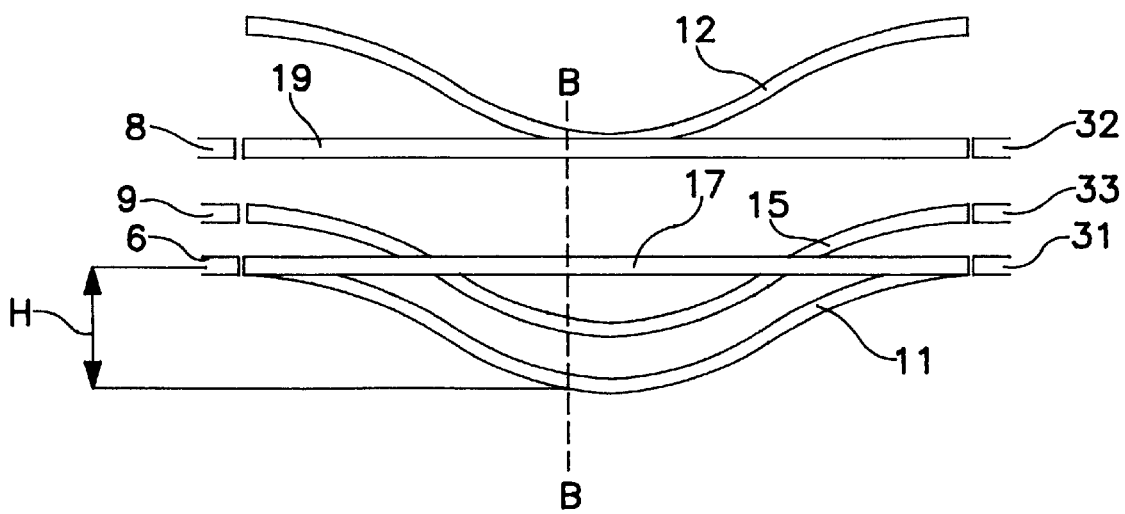
Figure 5:
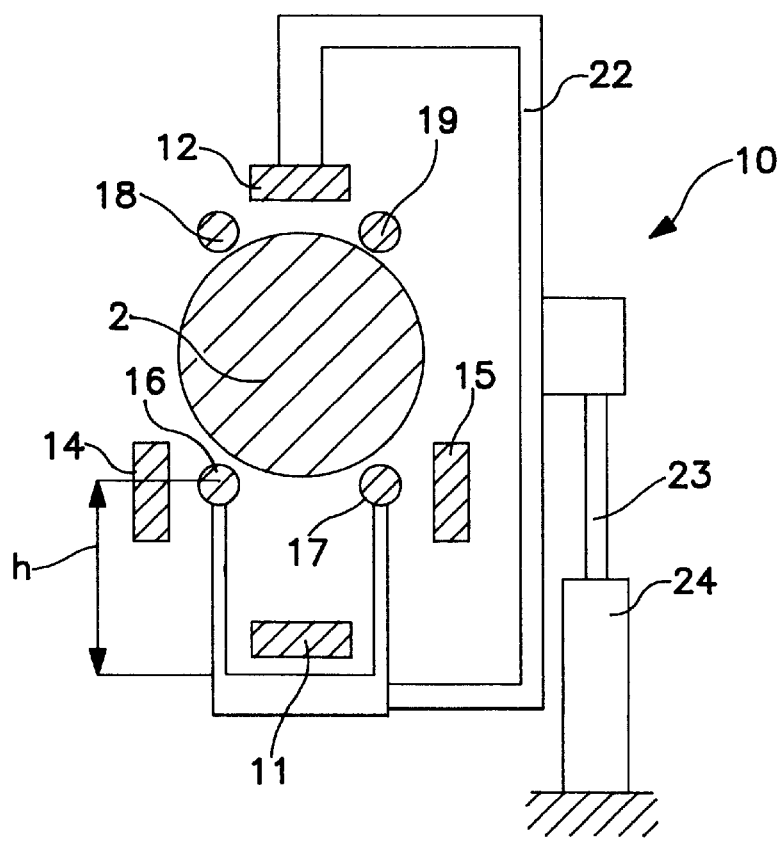

Referring to FIG. 1, an installation 1 for the heating and graphitising of cylindrical forgings 2 has a drive 3 whose driving rollers 4, 5 are disposed on both sides of the inlet of a first rectilinear guideway 6. Following the drive 3, the forgings 2 pass over the rectangular guideway 6 through a first heating station 7. Inside the heating station 7 and in the zone of its outlet the forgings 2 are additionally guided both from above by upper guideways 6 and also laterally by lateral guideways 9. Like the lower guideway 6, the guideways 8, 9 are rectilinear in construction.

Connected to the rectangular guideway 6 in the conveying direction F downstream on the first heating station 7 is an apparatus 10 by means of which the forgings 2 are guided into a graphitising basin 20 set up at a lower floor level.

Disposed in the conveying direction F downstream of the apparatus 10 are a second heating device 30 and a third heating device 40. The forgings 2 are guided through the heating devices 30, 40 in a straight line via lower guideways 31, upper guideways 32 and lateral guideways 33, which are each aligned with the first lower guideway 6, the first upper guideway 8 and the first lateral guideway 9 respectively.

The apparatus 10 has a first lower guideway 11 which is firmly held by retaining means (not shown) and is associated with an opposite second, adjustable upper guideway 12. The guideways 11, 12 are constructed curved, the curve being shaped after the fashion of a wave. In normal operation their ends are disposed at the level of the lower rectilinear guideways 6, 31 and the upper guideways 8, 32, while the vertex 13 of the lower guide path 11 is so placed that when they reach this point the forgings 2 are completely covered by the liquid contained in the graphitising basin 20. At the same time, the vertical distance apart of the guideways 11, 12 is so selected that over the entire conveying path the forgings 2 are securely guided on both their top and bottom sides.

In respect to their longitudinal axis L the guideways 11, 12 are aligned centrally in relation to the longitudinal axis L of the forgings 12. Their width b substantially corresponds to half the width D of the forgings 2.

For additional security, lateral guideways 14, 15 are disposed opposite whose shape is adapted to the course followed by the guideways 11, 12. The lateral guideways 14, 15 support the forgings 2 laterally in the zone of the curve.

A guide device 16, 17 taking the form of a straight guide rod extends on each side of the lower guideway 11. The distance apart and diameter of the guide devices 16, 17 is so selected that both straight guide devices 16, 17 are disposed inside the space laterally bounded by the lateral guideways 14, 15. Associated with each of the guide devices 16, 17 is a further, upper guide device 18, 19, these being aligned firmly by retaining means (not shown) at the level determined by the upper rectilinear guideways 8, 32.

The lower guide devices 16, 17 are connected via retaining elements 21 and a U-shaped frame 22 to piston 23 of an adjusting cylinder 24. Similarly, the upper curved guideway 12 is firmly connected via retaining elements 25 to the U-shaped frame. The length of the upper arm 26 of the U-shaped frame 22 is so selected that the frame 22 engages from above by the retaining element 25 around the upper guide device 19 associated with the side of the adjusting cylinder 24. At the same time, the height h of the retaining elements 21, 25 corresponds to the height H via which the vertex 13 of the lower curved guideway 11 is situated lower than the lower rectilinear guideway 6.

In normal operation the piston 23 of the adjusting cylinder 24 is situated in its retracted position, so that the guide devices 16, 17 are aligned at the level of the vertex 13 of the lower curved guideway 11, and the ends of the upper curved guideway 12 at the height of the upper rectilinear guideways 8, 32. In this operational position, the forgings 2 advanced item by item by means of the drive 3 and brought to the optimum graphitising temperature in the first heating device 7, are guided by the guideways 11, 12; 14, 15 first into the graphitising basin 20 and then to the further heating stations 30, 40.

For the emptying of the installation 1, the piston 23 is raised by means of the adjusting cylinder 24 until the lower guide devices 16, 17 are situated at the level of the lower rectilinear guideways 6, 31. The forgings 2 still present in the graphitising basin 20 are at the same time raised by the guide devices 16, 17. Due to the rigid coupling of the guide devices 16, 17 to the upper curved guideway 12, the latter is also raised, so that when the emptying travel position is reached it is no longer situated in the rectilinear conveying path determined by the guide devices 16, 17, 18, 19. When the guide devices 16, 17 have reached their emptying travel position agreeing with the level of the lower rectilinear guideways 6, 31, the forgings 2 are guided in a straight line from the inlet 50 of the guideways 11, 12 to their outlet 51. In this operational state the forgings 2 still present in the installation 1 are ejected by means of a conventional ejector (not shown).

We claim:

1. An apparatus for the guiding of workpieces (2) which has at least one curved guideway (11, 12) whose inlet and outlet are disposed in alignment to each other, characterized by a guide device (16, 17) which can be moved into a guide path provided by the curved guideway (11, 12) while entraining workpieces disposed in the guideway (11, 12) and which in the state positioned into the guide path so bridges the inlet (50) and the outlet (51) of the curved guideway (11, 12) that the work pieces (2) are transferred in a straight line from the inlet (50) of the curved guideway (11, 12) to its outlet (51).

2. An apparatus according to claim 1 characterised in that the curved guideway (11, 12) is connected to a rectilinear guideway (6, 8) which is disposed in alignment with a rectilinear guideway (31, 32) which follows the curved guideway (11, 12) downstream in the conveying direction (F).

3. An apparatus according to claim 1, characterised in that workpieces (2) are guided on two opposite sides of each curved guideway (11, 12; 14, 15); one of the curved guideways (11, 12) is adjustable; and the adjusting movement of the guide device (16, 17) is coupled to the adjusting movement of the adjustable curved guideway (12).

4. An apparatus according to claim 1, characterised in that the width (B) of the curved guideway (11, 12) is smaller than the width (D) of the workpieces (2), and each adjustable guide device (16, 17) is disposed laterally of the curved guideway (11, 12).

5. An apparatus according to claim 1 characterised in that the guide device (16, 17, 18, 19) takes the form of a guide rod.

* * * * *